March 18, 1930. E. C. SPARLING 1,751,110
CHANGE OF COURSE DETECTOR FOR COMPASSES
Original Filed Dec. 24, 1925
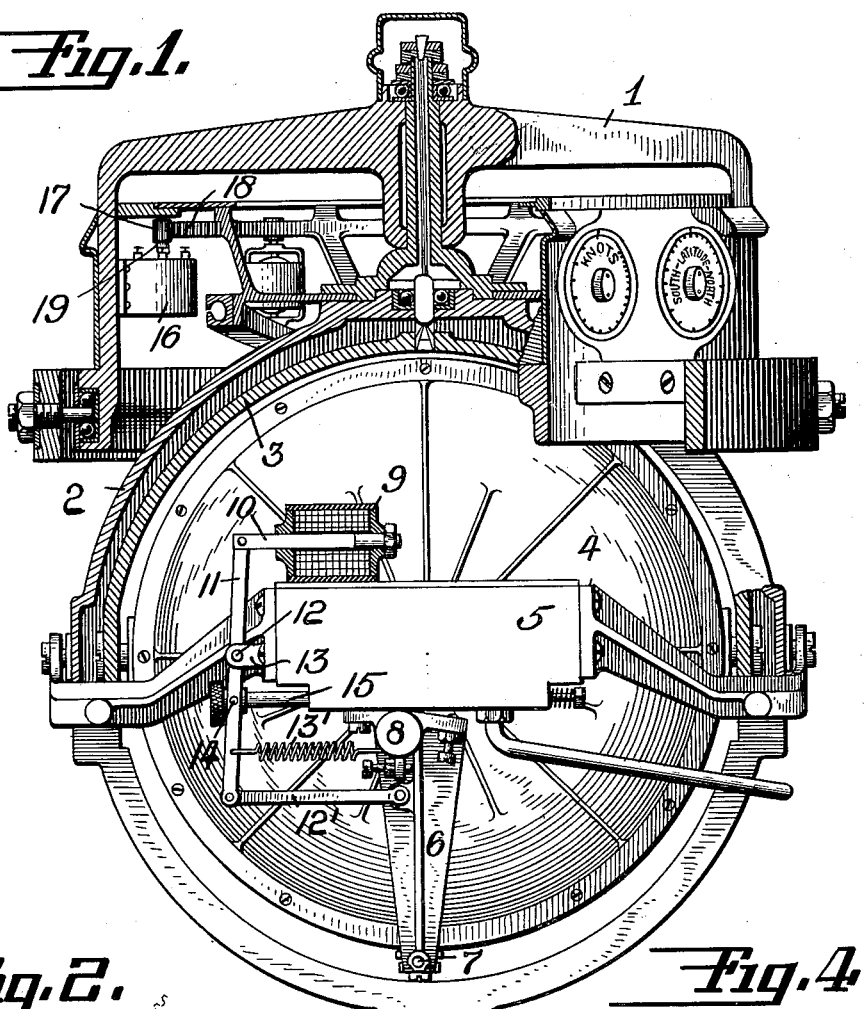
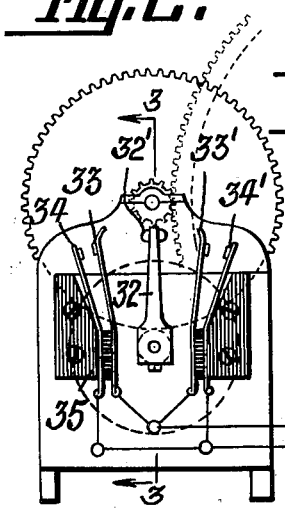
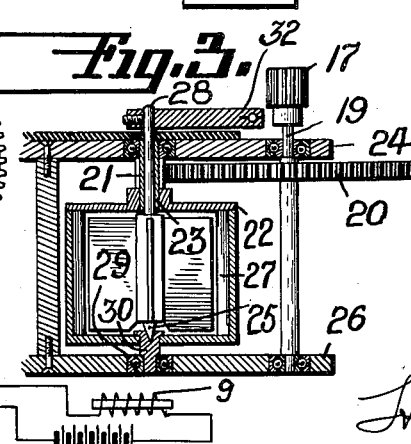
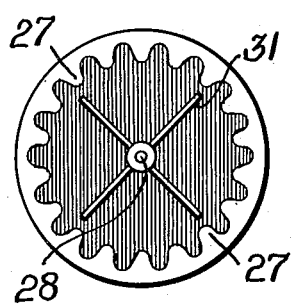
INVENTOR
Eric C. Sparling.
BY Herbert H. Thompson
his ATTORNEY

Patented Mar. 18, 1930

1,751,110

UNITED STATES PATENT OFFICE

ERIC C. SPARLING, OF GARDEN CITY, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

CHANGE OF COURSE DETECTOR FOR COMPASSES

Application filed December 24, 1925, Serial No. 77,451. Renewed August 8, 1929.

This invention relates to gyroscopic compasses in which means are employed to eliminate or otherwise compensate for the error due to the damping factor of the compass when the ship changes its speed or course. More especially, my invention relates to an improvement in the means employed to detect a change in course of the ship for bringing into action the damping error eliminator, or for other purposes.

To illustrate my invention, I have selected a compass of the Sperry liquid control type in which the said error is prevented by reducing the damping factor by a variation in the position of the point of connection of the arm joining the liquid gravitational factor with the compass. It is obvious that my invention may be applied to other forms of compasses and to other means of preventing the error or varying the damping factor within the scope of the appended claims.

Referring to the drawings in which one preferred form of the invention is shown:

Fig. 1 is an elevation of the south end of a Sperry compass of the type referred to looking north, parts being shown in section.

Fig. 2 is a top plan view on a larger scale of my turn detecting device.

Fig. 3 is a vertical section through the same on line 3—3 of Fig. 2.

Fig. 4 is a top view with the cover removed of the liquid drag arrangement of the detector.

In the drawings the usual supporting spider is shown at 1 which supports for turning about a vertical axis follow-up support 2 within which is supported the vertical ring 3 and the gyro case 4. Pivoted on the follow-up support 2 is the liquid control system 5 having an arm 6 connecting the same to the bottom of the gyro case at 7, which point is normally slightly eccentric to the vertical line passing through the center of the case. Said arm 6 is pivoted at 8 on the box 5 and is automatically moved so as to make the point of connection 7 with the case lie in the vertical line under the center of gravity thereof when the ship turns. This is shown as accomplished by means of solenoid 9 mounted on the box 5 having the core 10 thereof pivoted to lever 11. Said lever in turn is pivoted at 12 on a bracket 13 secured to the side of the box 5. At its lower end lever 11 is connected by a link 12' to the arm 6. A spring 13' connecting said lever and a fixed point on the box 5 may be employed to hold the arm 6 normally eccentric to the east of the center line of the gyroscope. When, however, the solenoid 9 is excited the core is drawn inwardly to the position shown in Fig. 1, placing the spring 13' under greater tension and moving the arm 6 slightly clockwise.

The theory of operation of this portion of the invention is set forth at greater length in a prior application of Elmer A. Sperry and Herbert H. Thompson, No. 436,900 for gyroscopic compasses, filed January 18, 1921, and assigned to the assignee of this application. Said lever 11 may also be pivotally connected at 14 to a slide valve 15 for the purpose of altering the period of the compass during the time the damping is eliminated, as fully explained in the patent of William R. Hight No. 1,686,524, granted Oct. 9, 1928, for gyroscopic compasses, and assigned to the assignee of the present application.

As hereinbefore stated, my invention relates particularly to the automatic means for operating the solenoid 9, in other words, for bringing into operation the damping eliminating or varying means when the ship turns. To accomplish this purpose I place preferably on the master compass a special device 16 for detecting turning of the ship. Said device is shown as provided with a pinion 17 meshing with the large gear 18 on the compass follow-up system, so that the gear 17 and its shaft 19 are rotated whenever the ship turns. On the shaft 19 is mounted a larger gear 20 meshing with a pinion 21, the latter being secured to one portion of a two part liquid drag device. As shown pinion 21 is secured to the casing 22 of a liquid container as by being mounted on a common sleeve 23 journaled in the upper plate 24 of the device. At the bottom, the casing 22 is shown journaled at 29 in the lower plate 26. Said casing is preferably provided on the interior with teeth, corrugations or blades 27 extending circumferentialy therearound.

Within the container is pivotally mounted a shaft 28 which extends through the sleeve 23 at the top and is journaled at the bottom in any suitable manner as by small thrust or centralizing bearing 25 in the bearing block 30 of casing 22. Within said casing there is mounted on shaft 28 the second part of the liquid drag device in the form of one or more blades or paddles 31 having a fairly small clearance between the outer edges of the same and the inner edges of the corrugations 27. To the upper end of said shaft 28 is shown secured an arm 32 which constitutes the actuating or operative means of the device. Lying in the path of said arm 32 is preferably placed two pairs of contacts 33—34 and 33'—34'. Each pair is shown as comprising two spring leaves normally spaced apart as shown in Fig. 2. The contacts proper are placed adjacent their free ends while the pairs of leaves are secured to a common block 35 adjacent the fixed ends. Some play is preferably allowed between the contact end 32' of the arm 32 and each set of contacts so as to prevent undue closing of the contacts by the hunting action of the follow-up system or by the yaw of the ship.

A marked turning of the ship, however, will result, first, in the rapid rotation of the casing 22 through the gearing described, setting up swirling of the liquid within the same. This tends to drag the blades 31 around with it and consequently moves the arm 32 against one or the other of contacts 33 or 33' depending on which way the ship is turning. Continued turning of the ship results in the closing of the contact against the spring pressure. As soon, however, as the ship ceases to turn the spring action of the spring arms will tend to move the arm 32 backwardly, i. e. will centralize the same to a limited extent, so as to open the contacts 33—34 shortly thereafter. The result is that the contact is only closed at the time the ship is turning which is what is desired. The contacts are, of course, placed in parallel in circuit with the solenoid 9 so that the solenoid is excited upon the closing of either pair of contacts as indicated in the elementary diagram forming part of Fig. 2.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A means responsive to the turning of a ship from a straight course comprising the combination with a gyro compass, of a pivoted two part liquid drag device, means whereby one of its parts is connected to said compass so as to be turned thereby when the ship turns, and operative means connected to the other part of said device to be moved thereby when the latter turns due to drag of the liquid.

2. A means responsive to the turning of a ship from a straight course comprising the combination with a gyro compass, of a two part liquid drag device, means whereby one of its parts is connected to said compass so as to be actuated thereby when the ship turns, operative means connected to the other part of said device to be moved thereby when the latter is actuated due to drag of the liquid, and contact members in the path of movement of said means for causing a secondary operation.

3. In a gyro-compass having means for varying the damping factor, of means for automatically operating said first named means comprising a two part liquid drag device, means whereby one of its parts is connected to said compass so as to be actuated thereby when the ship turns, the other part being actuated by said first part due to drag of the liquid, and means connected to the other part for bringing into action said first named means upon predetermined actuation of said second part.

4. In a gyro compass having means for varying the damping factor, of means for automatically operating said first named means comprising a two part liquid drag device, means whereby one of its parts is connected to said compass so as to be actuated thereby when the ship turns, an operating member connected to the other part to be moved thereby when the latter is actuated due to drag of the liquid, and contact members in the path of said member for bringing into action said first named means when operated.

5. In a gyro-compass having means for varying the damping factor, of means for automatically operating said first named means comprising a two part liquid drag device, means whereby one of its parts is connected to said compass so as to be turned thereby when the ship turns, means connected to the other part for bringing into action said first named means when said other part turns due to drag of the liquid, and centralizing means also connected to said other part.

6. A means responsive to the turning of a ship from a straight course comprising the combination with a gyro compass, of a two part liquid drag device, means whereby one of its parts is connected to said compass so as to be actuated thereby when the ship turns, operative means connected to the other part of said device to be moved thereby when the latter is actuated due to drag of the liquid, and means for returning said operative means on cessation of movement of said other part.

7. In a gyro compass having means for varying the damping factor, of means for automatically operating said first named means comprising a two part liquid drag device, means whereby one of its parts is connected to said compass so as to be actuated thereby when the ship turns, the other part being actuated by said first part due to drag of the liquid connected to the other part and a contact in the path of said means but spaced therefrom for bringing into action said first named means after a predetermined degree of actuation of said first part.

8. In a gyro compass having means for varying the damping factor, of means for automatically operating said first named means comprising a two part liquid drag device, means whereby one of its parts is connected to said compass so as to be turned thereby when the ship turns, an operating member connected to the other part to be moved thereby when the latter is turned due to drag of the liquid, and contact members in the path of said member comprising normally spaced spring members whereby actuation of the contacts is prevented by small oscillations of said member and said member is only partially centralized.

9. A means responsive to the turning of a ship from a straight course comprising the combination with a gyro compass, of a two part liquid drag device, comprising a liquid container having interior corrugations, a blade member within said container, and a member, means whereby one of said parts is connected to said compass, means whereby the other of said parts is connected to said member, and resilient means for said member for partially centralizing said member but permitting a limited amount of lost motion.

10. In combination with a master gyro compass for a dirigible craft, said compass having damping means, means for preventing the damping error due to turning of the craft, said last-named means including a two-part device for actuating said first-named means, one of said parts being in direct operating connection with said master compass and a friction drag device between said parts whereby the other of said parts is constrained to follow said first part.

In testimony whereof I have affixed my signature.

ERIC C. SPARLING.